(12) United States Patent
Fan

(10) Patent No.: US 12,429,146 B2
(45) Date of Patent: Sep. 30, 2025

(54) SERVO VALVE CONTROL METHOD AND SERVO VALVE MECHANISM

(71) Applicant: SHENZHEN KATOP AUTOMATION TECHNOLOGY CO., LTD., Guangdong (CN)

(72) Inventor: Zhenhua Fan, Guangdong (CN)

(73) Assignee: SHENZHEN KATOP AUTOMATION TECHNOLOGY CO., LTD., Guangdong (CN)

( * ) Notice: Subject to any disclaimer, the term of this patent is extended or adjusted under 35 U.S.C. 154(b) by 172 days.

(21) Appl. No.: 18/263,526

(22) PCT Filed: Dec. 1, 2021

(86) PCT No.: PCT/CN2021/134810
§ 371 (c)(1),
(2) Date: Jul. 29, 2023

(87) PCT Pub. No.: WO2022/160925
PCT Pub. Date: Aug. 4, 2022

(65) Prior Publication Data
US 2024/0084915 A1  Mar. 14, 2024

(30) Foreign Application Priority Data
Jan. 29, 2021 (CN) .......................... 202110129337.2

(51) Int. Cl.
*F16K 31/524* (2006.01)
*F16K 31/04* (2006.01)

(52) U.S. Cl.
CPC ...... *F16K 31/52408* (2013.01); *F16K 31/047* (2013.01); *Y02E 60/10* (2013.01)

(58) Field of Classification Search
CPC ............... F16K 31/047; F16K 31/5245; F16K 31/52408; F16K 31/524; Y02E 60/10
See application file for complete search history.

(56) References Cited

U.S. PATENT DOCUMENTS 2,630,137 A * 3/1953 Krone ..................... F16K 17/30
251/38
7,163,193 B2 * 1/2007 Chang ............... F16K 31/52408
251/263
(Continued)

FOREIGN PATENT DOCUMENTS

CN  202129186 U  2/2012
CN  103953778 A * 7/2014 .......... F16K 31/047
(Continued)

OTHER PUBLICATIONS

International Search Report issued in PCT/CN2021/134810 dated Jan. 27, 2022, 4 pages.
(Continued)

*Primary Examiner* — David Colon-Morales
(74) *Attorney, Agent, or Firm* — Hunton Andrews Kurth LLP

(57) ABSTRACT

A servo valve control method includes using a drive motor to drive a cam to run, using the cam to drive a valve core plug of a servo valve to go up or down to enable the servo valve to open or close in an opening range, selecting a segment of actual motion curve from a circle of theoretical motion curve of the cam, and controlling the cam to reciprocate in the selected actual motion curve to control an actual lifting stroke of the valve core plug to enable the servo valve to open or close. A servo valve mechanism includes a valve body and a drive motor. The valve body contains a cam motion track guide block, a valve core plug, a valve stem, and a valve core.

8 Claims, 4 Drawing Sheets

(56) References Cited

U.S. PATENT DOCUMENTS

| | | | | |
|---|---|---|---|---|
| 7,922,151 | B2* | 4/2011 | Petersen | F16K 31/52408 |
| | | | | 251/251 |
| 9,500,162 | B2* | 11/2016 | Sasaki | F16K 31/047 |
| 9,581,228 | B2* | 2/2017 | Nashery | F16K 39/024 |
| 10,054,084 | B2* | 8/2018 | Weis | F16K 31/047 |
| 10,094,485 | B2* | 10/2018 | Dolenti | H02P 6/08 |
| 10,145,491 | B2* | 12/2018 | Thiery | F16K 31/52408 |
| 10,253,760 | B2* | 4/2019 | Bagagli | F16K 31/524 |
| 10,473,232 | B2* | 11/2019 | Telep | F16K 31/5245 |
| 10,767,770 | B2* | 9/2020 | Sloma | F16K 31/52475 |
| 11,427,995 | B2* | 8/2022 | Kuru | F16K 31/408 |
| 11,491,866 | B2* | 11/2022 | Mills | F02M 25/089 |
| 11,992,856 | B2* | 5/2024 | Tokieda | B05C 11/10 |
| 2017/0191581 | A1* | 7/2017 | Brezowsky | F16K 31/52408 |

FOREIGN PATENT DOCUMENTS

| | | | | |
|---|---|---|---|---|
| CN | 105485414 | A | | 4/2016 |
| CN | 107013731 | A | * | 8/2017 |
| CN | 108105425 | A | * | 6/2018 ............. F16K 11/18 |
| CN | 108180049 | A | | 6/2018 |
| CN | 108591418 | A | | 9/2018 |
| CN | 210715966 | U | | 6/2020 |
| CN | 210950110 | U | * | 7/2020 |
| CN | 112963601 | A | | 6/2021 |
| DE | 102011103518 | A1 | * | 12/2012 ........... F01D 17/105 |
| JP | 2019107633 | U | | 7/2019 |
| JP | 2021102178 | A | | 7/2021 |

OTHER PUBLICATIONS

Chinese Office Action dated Mar. 14, 2022, in CN application No. 202110129337.2, 9 pages.

First Office Action issued in Japanese Patent Application No. 2023-546054 dated Mar. 12, 2024 (11 pages).

* cited by examiner

SERVO VALVE CONTROL METHOD AND SERVO VALVE MECHANISM

CROSS-REFERENCE TO RELATED APPLICATION

This is a National stage application, filed under 37 U.S.C. 371, of International Patent Application NO. PCT/CN2021/134810, filed on Dec. 1, 2021, which is based on and claims priority to Chinese Patent Application No. 202110129337.2 filed with the China National Intellectual Property Administration (CNIPA) on Jan. 29, 2021, the disclosure of which is incorporated herein by reference in its entirety.

TECHNICAL FIELD

The present disclosure relates to the field of servo valves, particularly a servo valve control method and a servo valve mechanism.

BACKGROUND

In the field of lithium battery coating, one of the control methods generally uses a cylinder to control an intermittent coating valve to perform current intermittent coating at a coating speed of 15 m/min; and another of the control methods switches the intermittent coating valve of a device from being pneumatically-controlled to being electrically-driven at a higher coating speed of 15-20 m/min. However, the desire to continue increasing the intermittent coating speed encounters the bottleneck of electronic control response.

Generally, the start/stop or acceleration/deceleration of the servo has a response time limit of 5-6 ms. When the intermittent coating speed rises to more than 25-30 m/min and the coating gap length is 5 mm, the actual start/stop time of the servo is close to 8 ms, reaching the response time limit of the servo. As a result, the open/close process of the servo valve cannot be finely controlled electronically, and the coating speed cannot be faster.

Moreover, in practice, an existing intermittent coating control method has disadvantages such as non-uniform coating head and tail thickness and poor coating quality, which is not conducive to the improvement of the production quality of a battery.

Therefore, to make intermittent coating faster and higher-quality, a new solution is required.

In view of this, the present disclosure is to provide a new solution to solve the existing technical defects.

SUMMARY

To overcome the disadvantages of the existing art, the present disclosure provides a servo valve control method and a servo valve mechanism, solving the problem of servo response limit in the existing art, breaking through a servo limit in the existing art to make intermittent coating have a speed of more than 30 m/min, and overcoming defects such as non-uniform coating head and tail thickness of intermittent coating in the existing art.

The present disclosure uses the following solution to solve the problem:

A servo valve control method includes using a drive motor to drive a cam to run, using the cam to drive a valve core plug of a servo valve to go up or down to enable the servo valve to open or close in an opening range, selecting a segment of actual motion curve from a circle of theoretical motion curve of the cam, and controlling the cam to reciprocate in the selected actual motion curve to control an actual lifting stroke of the valve core plug to enable the servo valve to open or close.

In an improvement on the preceding solution, the drive motor controls the cam to reciprocate in the selected actual motion curve, and when the cam is moving from a low point to a high point in the actual motion curve during opening or is moving from a high point to a low point in the actual motion curve during closing, the cam controls the valve core plug to move at one of the three types of speed: a slow-and-then-fast speed, a fast-and-then-slow speed, or a roughly uniform speed.

In a greater improvement on the preceding solution, when the cam is moving in the actual motion curve, the motion curve of the cam is a sine motion wave, a cosine motion wave, or a composite motion wave composed of a sine motion wave and a cosine motion wave.

In an improvement of the preceding solution, a rotation range of $-90°$ to $0°$ is selected from the motion curve of the cam to serve as the actual motion range of the cam, and the cam drives the valve core plug to move at a slow-and-then-fast speed in the selected actual motion range.

In a second improvement of the preceding solution, a rotation range of $-45°$ to $45°$ is selected from the motion curve of the cam to serve as the actual motion range of the cam, and the cam drives the valve core plug to move at a roughly uniform speed in the selected actual motion range.

In a third improvement of the preceding solution, in a motion curve of the cam, a rotation range of $0°$ to $90°$ is selected from the motion curve of the cam to serve as the actual motion range of the cam, and the cam drives the valve core plug to move at a fast-and-then-slow speed in the selected actual motion range.

In a further improvement on the preceding solution, the actual motion curve in which the cam reciprocates is a subdivided segment selected from the preceding three preferred motion curves so that combination forms of 6, 9, or more subdivided curves are formed.

The present disclosure also provides a servo valve mechanism. The servo valve mechanism includes a valve body and a drive motor. The valve body contains a cam motion track guide block and a valve core plug. The cam motion track guide block is connected to the valve core plug. A cam is disposed at an output end of the drive motor. The cam is movably connected to the cam motion track guide block and configured to drive the cam motion track guide block to slide in the guiding direction of the cam motion track guide block. The drive motor is configured to drive the cam to run to drive the cam motion track guide block and the valve core plug by the cam to go up or down. An actual motion curve along which the drive motor drives the cam to run is part of a circle of theoretical motion curve of the cam. The cam is configured to reciprocate in the actual motion curve.

In an improvement on the preceding solution, the drive motor is a servo motor, two or more cams are provided, respective motion curves can be selected from the defined three preferred motion curves according to required opening or closing time to form more combination forms, the cam motion track guide block is connected to the valve core plug by a valve stem, and the valve body also contains a valve core matching the valve core plug.

The beneficial effects of the present disclosure are as follows: the present disclosure provides a servo valve control method and a servo valve mechanism. The servo valve control method includes using a drive motor to drive a cam to run, using the cam to drive a valve core plug of a servo valve to go up or down to enable the servo valve to open or close in an opening range, selecting a segment of actual motion curve from a circle of theoretical motion curve of the cam, and controlling the cam to reciprocate in the selected actual motion curve to control an actual lifting stroke of the valve core plug to enable the servo valve to open or close. The method solves the problem of servo response limit of the existing servo valve and makes the coating efficiency higher by increasing the coating speed of intermittent coating to 30 m/min or higher.

Moreover, the method effectively alleviates defects such as non-uniform coating head and tail thickness and poor coating head and tail quality of the existing intermittent coating, improving the coating quality, indirectly improving subsequent battery quality, and improving the yield.

In conclusion, the servo valve control method and the servo valve mechanism solve the problem of servo response limit in the existing art, break through a servo limit in the existing art, make intermittent coating have a speed of more than 30 m/min, and overcome defects such as non-uniform coating head and tail thickness of intermittent coating in the existing art.

BRIEF DESCRIPTION OF DRAWINGS

The present disclosure is described hereinafter in conjunction with drawings and embodiments.

DETAILED DESCRIPTION

A concept, a specific structure and technical effects of the present disclosure are clearly and completely described below in conjunction with the embodiments and drawings, so as to fully understand the object, feature and effects of the present disclosure. Apparently, the embodiments described herein are part, not all, of the embodiments of the present disclosure. Based on the embodiments of the present disclosure, other embodiments obtained by those skilled in the art on the premise that no creative work is done are within the scope of the present disclosure. In addition, all coupling/connection relationships involved in the patent do not mean that components are directly connected, but mean that according to a specific implementation, coupling accessories are added or reduced so as to compose a better coupling structure.

Referring to FIGS. 1 to 6, various technical features in the present disclosure can be combined interactively on the premise of not contradicting each other.

In the existing art, the start/stop or acceleration/deceleration of a servo has a response time limit of 5-6 ms. This response time limit cannot be corrected in advance according to a rule.

With regard to intermittent coating, the coating gap length is 5 mm, the coating speed rises to greater than 30 m/min, and the response time required by the servo valve is close to the servo response time limit.

When the response time required by the servo valve is close to the servo response time limit, the opening or closing process of the servo valve cannot be adjusted by software subdivided parameters and can be controlled by only a mechanism rigidity rule.

When the response time required by the servo valve is close to the servo response time limit, it is not possible to precisely control the coating thickness within a short length.

Figure 6:
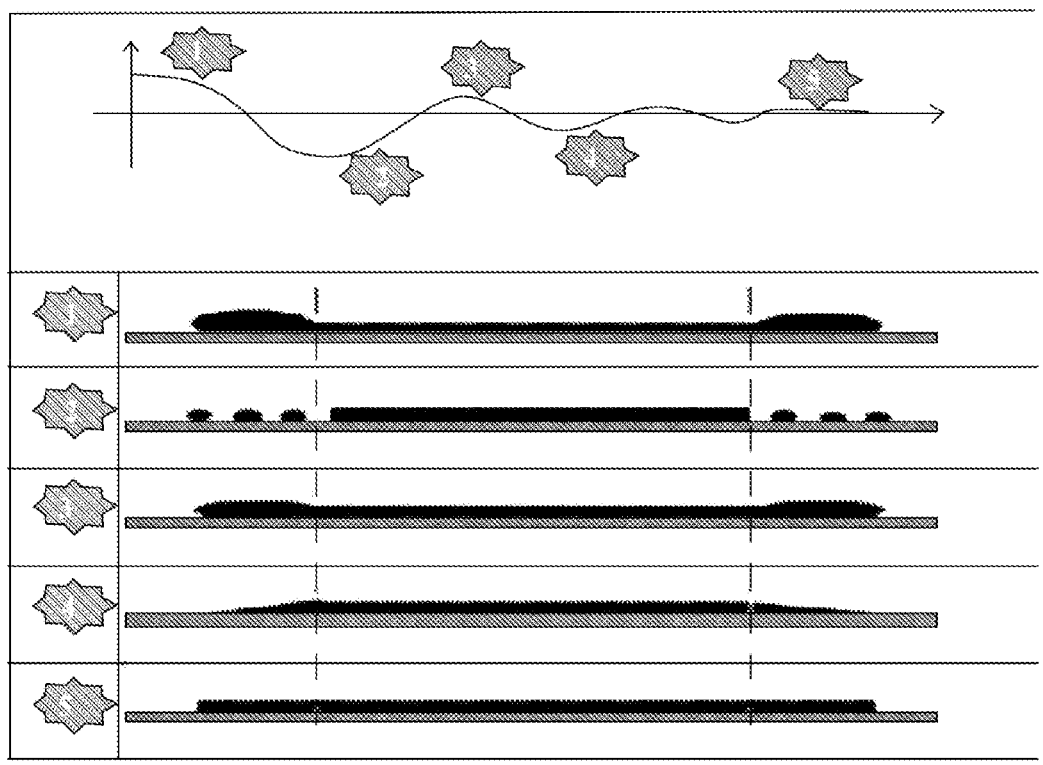
FIG. 6 is a diagram illustrating head and tail feature defects of a product.

Referring to FIG. 6, in an intermittent coating process, a coating thickness status is shown in FIG. 6. FIG. 6 is a section view of coating slurry of five types of intermittent coating. As shown in FIG. 6, the coating head and tail in the first and the third are excessively thick, caused by an excessive instantaneous feed; and the coating head and tail of the second and the fourth is too thin or even missing, caused by an insufficient instantaneous feed. The fifth is ideal coating status. Precise and subdivided control of the opening or closing of the servo valve is required to achieve the status of the fifth.

A new solution is required to solve defects in the existing art.

Figure 1:
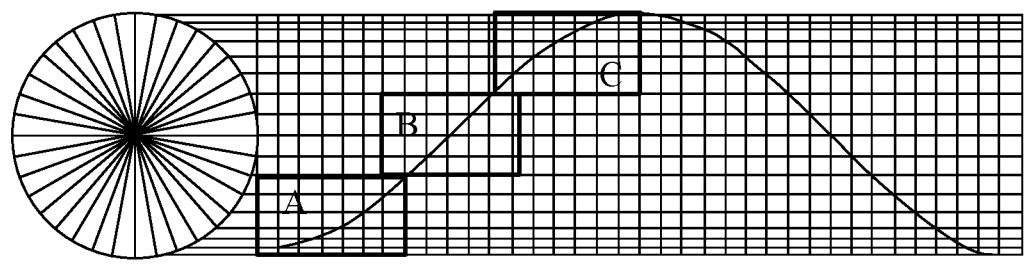
FIG. 1 is a view of a cam motion curve of the present disclosure.

Therefore, referring to FIG. 1, the present disclosure provides a servo valve control method. The method includes using a drive motor to drive a cam to run, using the cam to drive a valve core plug of a servo valve to go up or down to enable the servo valve to open or close in an opening range, selecting a segment of actual motion curve from a circle of theoretical motion curve of the cam, and controlling the cam to reciprocate in the selected actual motion curve to control an actual lifting stroke of the valve core plug to enable the servo valve to open or close.

This servo valve control method makes intermittent coating have a speed of greater than 30 m/min, achieving the target of high-speed intermittent coating, increasing a feeding balance of intermittent coating, ensuring a uniform material thickness of intermittent coating, and improving the coating quality.

In application, the actual motion curve of the cam may be a small part of the theoretical motion curve of the cam and is smaller than the theoretical motion curve of the cam. The actual motion curve in which the cam reciprocates is smaller than the theoretical motion curve of the cam.

Generally, one-third of a lifting stroke of the cam is used as the actual motion curve of the cam and defined as a basic valve core opening degree. The lifting motion curve of the cam is subdivided. Other subdivided proportions may be derived based on the basic valve core opening degree.

In practical application, according to application and implementation requirements, it is feasible to select a proper actual motion curve of the cam from a circle of theoretical motion curve of the cam and use the drive motor to drive the cam to reciprocate in the actual motion curve to control the valve core plug to move up or down in the selected actual stroke.

In an embodiment, the drive motor controls the cam to reciprocate in the selected actual motion curve, and when the cam is moving from a low point to a high point in the actual motion curve, the cam controls the valve core plug to move at one of the three types of speed: a slow-and-then-fast speed, a fast-and-then-slow speed, or a roughly uniform speed.

Referring to FIG. 1, when the actual motion curve of the cam is within box A, the cam drives the valve core plug at a slow-and-then-fast speed; when the actual motion curve of the cam is within box B, the cam drives the valve core plug at a roughly uniform speed; and when the actual motion curve of the cam is within box C, the cam drives the valve core plug at a fast-and-then-slow speed.

Figure 4:
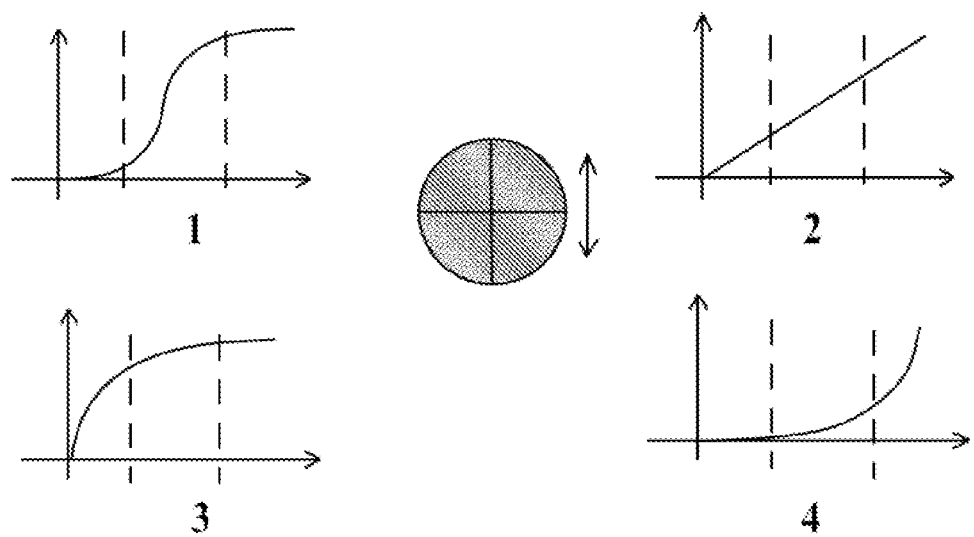
FIG. 4 is a diagram of subdivided control of a cam motion curve below the response time limit.

FIG. 4 shows cam motion tracks selected according to the concept of the present disclosure and their respective cam rotation ranges and directions.

In FIG. 4, the cam moves at a slow-and-then-fast speed along track 1, the cam moves at a roughly uniform speed along track 2, the cam moves at a fast-and-then-slow speed along track 3, and the cam moves at a fast-and-then-slow-and-then-fast speed along track 4. Track 4 is a composite accelerating motion curve.

Referring to track 1 of FIG. 4 and box A of FIG. 1, in a first preferred embodiment, in the motion curve of the cam, a rotation range from −90° to 0° is selected as the actual motion range of the cam. In the selected actual motion range, the cam drives the valve core plug at a slow-and-then-fast speed.

Referring to track 2 of FIG. 4 and box B of FIG. 1, in a second preferred embodiment, in the motion curve of the cam, a rotation range from −45° to 45° is selected as the actual motion range of the cam. In the selected actual motion range, the cam drives the valve core plug at a roughly uniform speed.

Referring to track 3 of FIG. 4 and box C of FIG. 1, in a third preferred embodiment, in the motion curve of the cam, a rotation range from 0° to 90° is selected as the actual motion range of the cam. In the selected actual motion range, the cam drives the valve core plug at a fast-and-then-slow speed.

In addition to the previous three preferred embodiments, it is also feasible to select a segment from track 4 of FIG. 4 according to requirements to serve as the actual motion curve and actual motion stroke of the cam.

Figure 5:
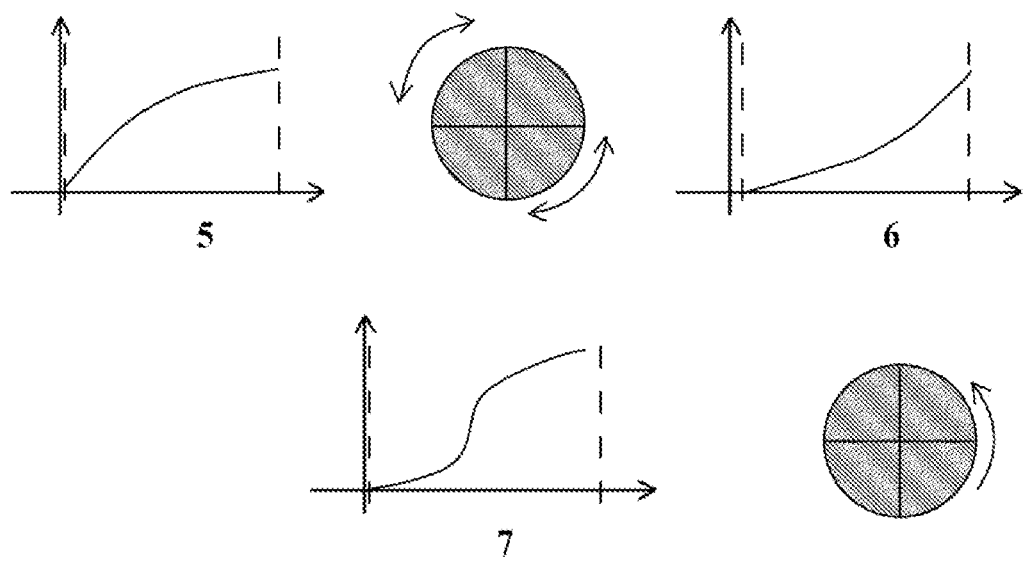
FIG. 5 is a diagram of subdivided control of a cam motion curve at the response time limit.

In FIG. 5, track 5 is a segment selected from track 3 and is controlled according to the inherent sine wave of the cam, track 6 is a segment selected from track 1 and is controlled according to the cosine wave of the cam, and track 7 is a segment selected from a composite accelerating motion curve. This means that it is feasible to select or reduce the angle range of one of the preceding three preferred basic curves according to the actual valve core opening degree to derive 6 or 9 more-segmented curves and angle ranges.

In an embodiment, one-third of a lifting stroke of the cam is used as the actual motion curve of the cam and defined as a basic valve core opening degree. The lifting motion curve of the cam is subdivided. Other subdivided proportions may be derived based on the basic valve core opening degree.

In an embodiment, when the cam is moving in the actual motion curve, the motion curve of the cam is a sine motion wave, a cosine motion wave, or a composite motion wave composed of a sine motion wave and a cosine motion wave.

In practical application, quality control of coating head and tail thickness, subdivision control of a cam curve, and matching based on the adhesiveness and speed of coating material can effectively alleviate the defects of non-uniform coating head and tail thickness and poor coating quality in the existing art and can improve the coating quality, coating uniformity, and yield.

Figure 2:
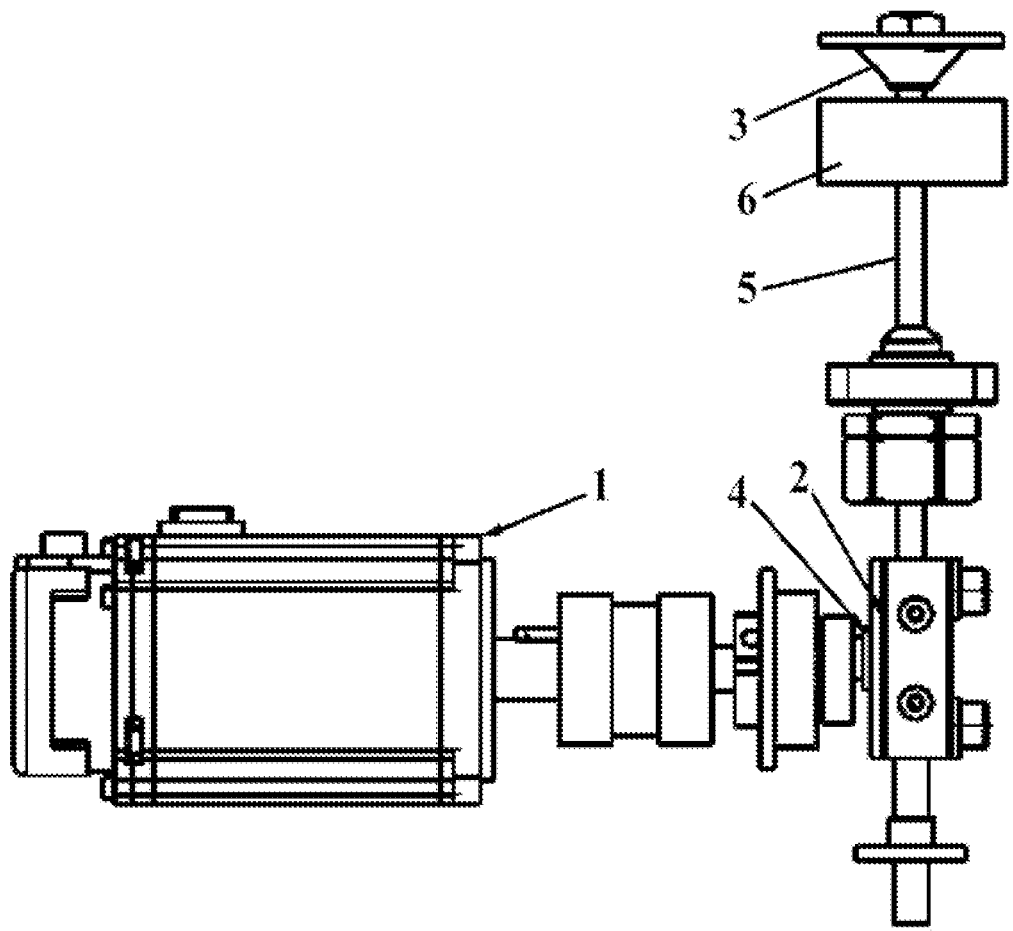
FIG. 2 is a view of a servo valve mechanism of the present disclosure.
Figure 3:
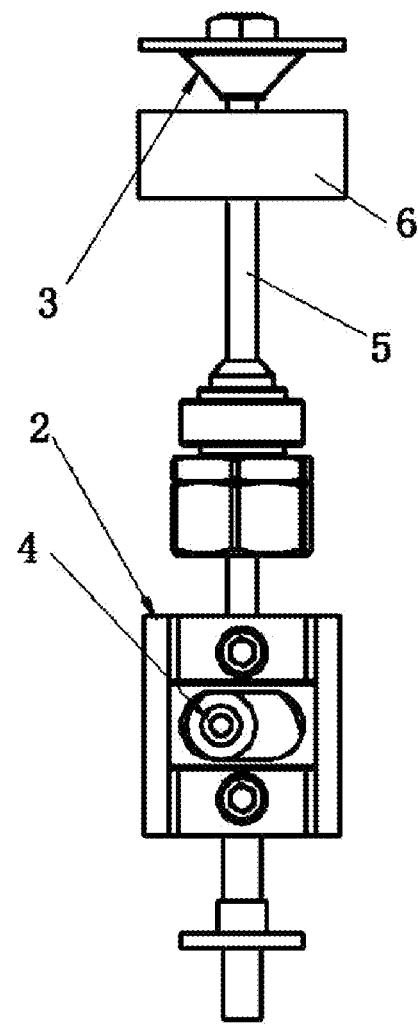
FIG. 3 is a view of a valve stem of a servo valve of the present disclosure.

Referring to FIGS. 2 and 3, the present disclosure also provides a servo valve mechanism. The servo valve mechanism includes a valve body (not shown) and a drive motor 1. The valve body contains a cam motion track guide block 2 and a valve core plug 3. The cam motion track guide block 2 is connected to the valve core plug 3. A cam 4 is disposed at an output end of the drive motor 1. The cam 4 is movably connected to the cam motion track guide block 2 and configured to drive the cam motion track guide block 2 to slide in the guiding direction of the cam motion track guide block 2. The drive motor 1 is configured to drive the cam 4 to run to drive the cam 4 to drive the cam motion track guide block 2 and the valve core plug 3 to go up or down. An actual motion curve along which the drive motor 1 drives the cam 4 to run is part of a theoretical motion curve in which the cam 4 moves from the lowest point to the highest point. The cam 4 is configured to reciprocate in the actual motion curve.

In an embodiment, the drive motor 1 is a servo motor, two or more cams 4 are provided, and for different valves, respective motion curves can be selected from the defined three preferred motion curves according to required opening or closing time to form more combination forms. The cam motion track guide block 2 is connected to the valve core plug 3 by a valve stem 5. The valve body also contains a valve core 6 matching the valve core plug 3.

The drive motor 1 drives a cam seat to rotate by a coupling. The cam 4 is mounted on the cam seat. A cam mounting channel matching the cam 4 is disposed on the cam motion track guide block 2. The cam 4 is movably disposed in the cam mounting channel of the cam motion track guide block 2. After starting to work, the drive motor 1 drives the cam seat and the cam 4 by the coupling to rotate. The cam 4 drives the cam motion track guide block 2 to move in the guiding direction of the cam motion track guide block 2. The cam motion track guide block 2 drives the valve core plug 3 by the valve stem 5 to move up or down so that the valve core plug 3 and the valve core 6 cooperate to enable the servo valve to open or close.

This servo valve mechanism makes intermittent coating have a speed of greater than 30 m/min, achieving the target of high-speed intermittent coating, increasing a feeding balance of intermittent coating, ensuring a uniform material thickness of intermittent coating, and improving the coating quality.

The preceding is a detailed description of preferred embodiments of the present disclosure. However, the present disclosure is not limited to the embodiments. Various equivalent modifications or alterations may further be made by those skilled in the art without departing from the spirit of the present disclosure. These equivalent modifications or alterations fall within the scope of the claims in the present application.

What is claimed is:

1. A servo valve control method, comprising:
using a drive motor to drive a cam to run, using the cam to drive a valve core plug of a servo valve to go up or down to enable the servo valve to open or close in an opening range, selecting a segment of actual motion curve from a circle of theoretical motion curve of the cam, and controlling the cam to reciprocate in the selected actual motion curve to control an actual lifting stroke of the valve core plug to enable the servo valve to open or close;
wherein when the cam is moving in the actual motion curve, the motion curve of the cam is a sine motion wave, a cosine motion wave, or a composite motion wave composed of a sine motion wave and a cosine motion wave.

2. The servo valve control method of claim 1, wherein the drive motor controls the cam to reciprocate in the selected actual motion curve, and when the cam is moving from a low point to a high point in the actual motion curve, the cam controls the valve core plug to move at one of three types of speed: a slow-and-then-fast speed, a fast-and-then-slow speed, or a roughly uniform speed.

3. The servo valve control method of claim 1, wherein a rotation range of −90° to 0° is selected from the motion curve of the cam to serve as an actual motion range of the cam, and the cam drives the valve core plug to move at a slow-and-then-fast speed in the selected actual motion range.

4. The servo valve control method of claim 1, wherein a rotation range of −45° to 45° is selected from the motion curve of the cam to serve as an actual motion range of the cam, and the cam drives the valve core plug to move at a roughly uniform speed in the selected actual motion range.

5. The servo valve control method of claim 1, wherein a rotation range of 0° to 90° is selected from the motion curve of the cam to serve as an actual motion range of the cam, and the cam drives the valve core plug to move at a fast-and-then-slow speed in the selected actual motion range.

6. The servo valve control method of claim 1, wherein one-third of a lifting stroke of the cam is used as the actual motion curve of the cam and defined as a basic valve core opening degree.

7. The servo valve control method of claim 1, wherein the actual motion curve in which the cam reciprocates is a subdivided segment of the theoretical motion curve of the cam.

8. A servo valve mechanism, comprising:
a valve body and a drive motor, wherein the valve body contains a cam motion track guide block and a valve core plug, the cam motion track guide block is connected to the valve core plug, a cam is disposed at an output end of the drive motor, the cam is movably connected to the cam motion track guide block and configured to drive the cam motion track guide block to slide in a guiding direction of the cam motion track guide block, the drive motor is configured to drive the cam to run to drive the cam motion track guide block and the valve core plug by the cam to go up or down to enable the valve body to open or close in an opening range, an actual motion curve along which the drive motor drives the cam to run is part of a circle of theoretical motion curve of the cam, and the cam is configured to reciprocate in the actual motion curve to control an actual lifting stroke of the valve core plug to enable the valve body to open or close;
wherein when the cam is moving in the actual motion curve, the motion curve of the cam is a sine motion wave, a cosine motion wave, or a composite motion wave composed of a sine motion wave and a cosine motion wave.

* * * * *